UNITED STATES PATENT OFFICE.

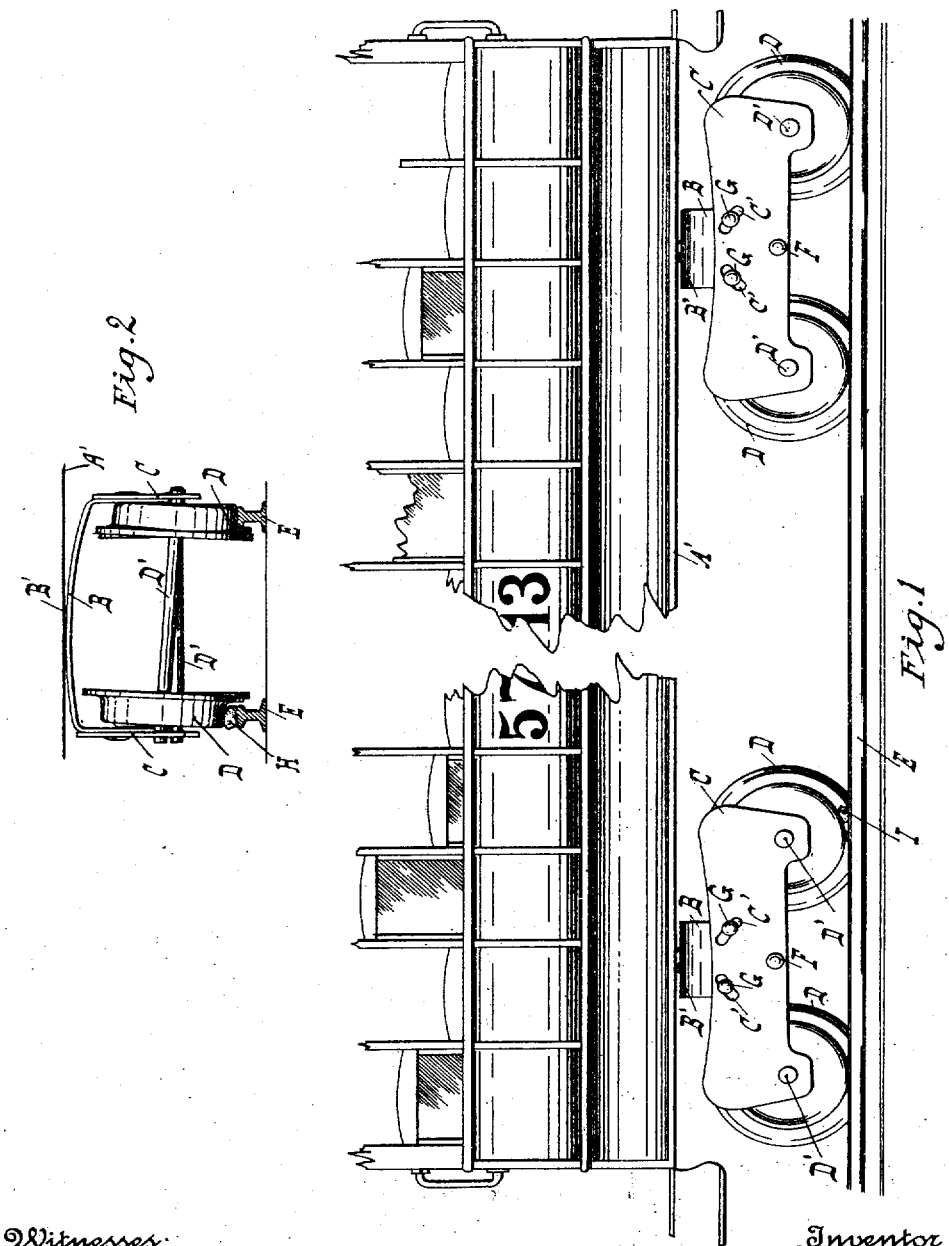

HARRY C. GRANT, OF BAYONNE, NEW JERSEY, ASSIGNOR, BY MESNE ASSIGNMENTS, TO THE LIONEL MANUFACTURING COMPANY, A CORPORATION OF CONNECTICUT.

TRUCK.

No. 931,414.      Specification of Letters Patent.      Patented Aug. 17, 1909.

Application filed January 22, 1908. Serial No. 412,051.

*To all whom it may concern:*

Be it known that I, HARRY C. GRANT, a citizen of the United States, and a resident of Bayonne, in the county of Hudson and State of New Jersey, have invented certain new and useful Improvements in Trucks, of which the following is a specification.

My invention relates to car trucks and its object is to provide a truck wherein all the wheels will always be on the track irrespective of track irregularities ordinarily encountered, and a further object is to prevent the raising of one or both wheels a limited distance above the rail, by a stone or other foreign body, from causing the raising of either wheel at the other side of the truck, or the tilting of the platform or floor of the car a corresponding distance.

A still further object is to attain simplicity and cheapness of construction.

Referring to the drawings which form a part of this specification,—Figure 1, is a side elevational view of a pair of my improved trucks, on which is mounted a car body, broken through its center to save space in illustrating. Fig. 2, is an end view of one of the trucks illustrating the relative position of the wheels and platform when one of said wheels is elevated above the rail.

A, indicates a car body, and A', the floor line thereof.

B, indicates the cross frames of the trucks, and C, the side frames.

D, indicates the wheels, and D', the axles on which the wheels are mounted.

E, indicates the rails.

The cross frame B, is connected to the floor of the car A, at its center by a bolt which passes through a boss B', formed on the top of the cross frame B, which serves to separate the car body from the top of said frame a short distance, and the cross frame B, is curved, so that the car body may rock on the boss B' a predetermined distance before it will come in contact with the top surface of the cross frame B. The frame B is free to rotate on the said bolt as far as the flanges of the truck wheels will permit, thus allowing the car to turn on short curves. The ends of the axles D' rest in suitable bearings in the side frames C. The side frames C are connected in pivotal relation at F and the oscillating or swinging movement in a longitudinal plane is limited by projecting studs G—G, which are connected to the cross frame B, and pass through slots C'—C' in the side frames, and are provided with rivet heads at their outer ends which serve to hold the side frames and cross frames in proper relative positions.

H and I indicate obstacles on the rails over which the wheels must pass, and the position of the cross frame in Fig. 2 and side frame in Fig. 1, illustrate the position the truck would be in under the conditions illustrated.

Having thus described my invention, what I claim as new and desire to secure by Letters Patent, is,—

1. A truck comprising a cross frame and two side frames, each of which latter are pivoted to said cross frame, means for limiting the pivotal movement of said side frames, and axles supported by said side frames and provided with wheels.

2. A truck comprising a cross frame having an arched top, side frames pivoted to said cross frame, means for limiting the pivotal movement of said side frames, axles bearing in said side frames, and wheels on said axles.

3. A truck comprising a cross frame having a raised portion at its center adapted to serve as a bearing for a car body, side frames pivoted to said cross frame, means for limiting the pivotal action of said side frames, axles carried by said side frames, and wheels connected to said axles.

4. A truck comprising a cross frame, side frames pivotally connected to said cross frame, and each containing slots, studs projecting from the side frame and engaged within the slots, axles bearing in the side frames and wheels on said axles.

5. A truck comprising a cross frame with means for permitting a lateral rocking movement of the same, side frames connected to said cross frame, and each containing slots, studs projecting from the side frame and engaged within the slots, axles bearing in the side frames, and wheels on said axles.

6. A truck comprising a cross frame having a perforated central rounded bearing portion, side frames pivotally connected to said cross frame, and each containing slots, studs projecting from the side frame and engaged within the slots, axles bearing in the side frames, and wheels on said axles.

7. A truck comprising a cross frame embodying a centrally perforated arched portion with vertically depending end parts, side frames pivotally connected to said end parts, and each containing slots, studs projecting from the end parts and engaged within the slots, axles bearing in the end parts, and wheels on said axles.

8. A truck comprising two side frames forming bearings for the axles of said truck; a cross carrying frame pivotally connected to said side frames; said carrying frame having an arched top surface adapted to bear against the car body to either side of the center of said frame when and as the horizontal angle of the truck is altered.

9. A truck comprising two side frames forming bearings for the axles of the truck; a cross carrying frame pivotally connected to said side frame, the upper surface of said carrying frame being formed to an even curve throughout.

Signed at New York city in the county of New York and State of New York this 27th day of August A. D. 1907.

HARRY C. GRANT.

Witnesses:
WM. PAXTON,
JOHN H. LYNCH.

---

Correction in Letters Patent No. 931,414.

It is hereby certified that the name of the assignee in Letters Patent No. 931,414, granted August 17, 1909, upon the application of Harry C. Grant, of Bayonne, New Jersey, for an improvement in "Trucks," was erroneously written and printed "The Lionell Manufacturing Company" whereas said name should have been written and printed *The Lionel Manufacturing Company;* and that the said Letters Patent should be read with this correction therein that the same may conform to the record of the case in the Patent Office.

Signed and sealed this 25th day of October, A. D., 1910.

[SEAL.]

E. B. MOORE,
*Commissioner of Patents.* side frames pivotally connected to said end parts, and each containing slots, studs projecting from the end parts and engaged within the slots, axles bearing in the end parts, and wheels on said axles.

8. A truck comprising two side frames forming bearings for the axles of said truck; a cross carrying frame pivotally connected to said side frames; said carrying frame having an arched top surface adapted to bear against the car body to either side of the center of said frame when and as the horizontal angle of the truck is altered.

9. A truck comprising two side frames forming bearings for the axles of the truck; a cross carrying frame pivotally connected to said side frame, the upper surface of said carrying frame being formed to an even curve throughout.

Signed at New York city in the county of New York and State of New York this 27th day of August A. D. 1907.

HARRY C. GRANT.

Witnesses:
WM. PAXTON,
JOHN H. LYNCH.

---

Correction in Letters Patent No. 931,414.

It is hereby certified that the name of the assignee in Letters Patent No. 931,414, granted August 17, 1909, upon the application of Harry C. Grant, of Bayonne, New Jersey, for an improvement in "Trucks," was erroneously written and printed "The Lionell Manufacturing Company" whereas said name should have been written and printed *The Lionel Manufacturing Company;* and that the said Letters Patent should be read with this correction therein that the same may conform to the record of the case in the Patent Office.

Signed and sealed this 25th day of October, A. D., 1910.

[SEAL.]

E. B. MOORE,
*Commissioner of Patents.*

Correction in Letters Patent No. 931,414.

It is hereby certified that the name of the assignee in Letters Patent No. 931,414, granted August 17, 1909, upon the application of Harry C. Grant, of Bayonne, New Jersey, for an improvement in "Trucks," was erroneously written and printed "The Lionell Manufacturing Company" whereas said name should have been written and printed *The Lionel Manufacturing Company;* and that the said Letters Patent should be read with this correction therein that the same may conform to the record of the case in the Patent Office.

Signed and sealed this 25th day of October, A. D., 1910.

[SEAL.]

E. B. MOORE.

*Commissioner of Patents.*